Figure 1:
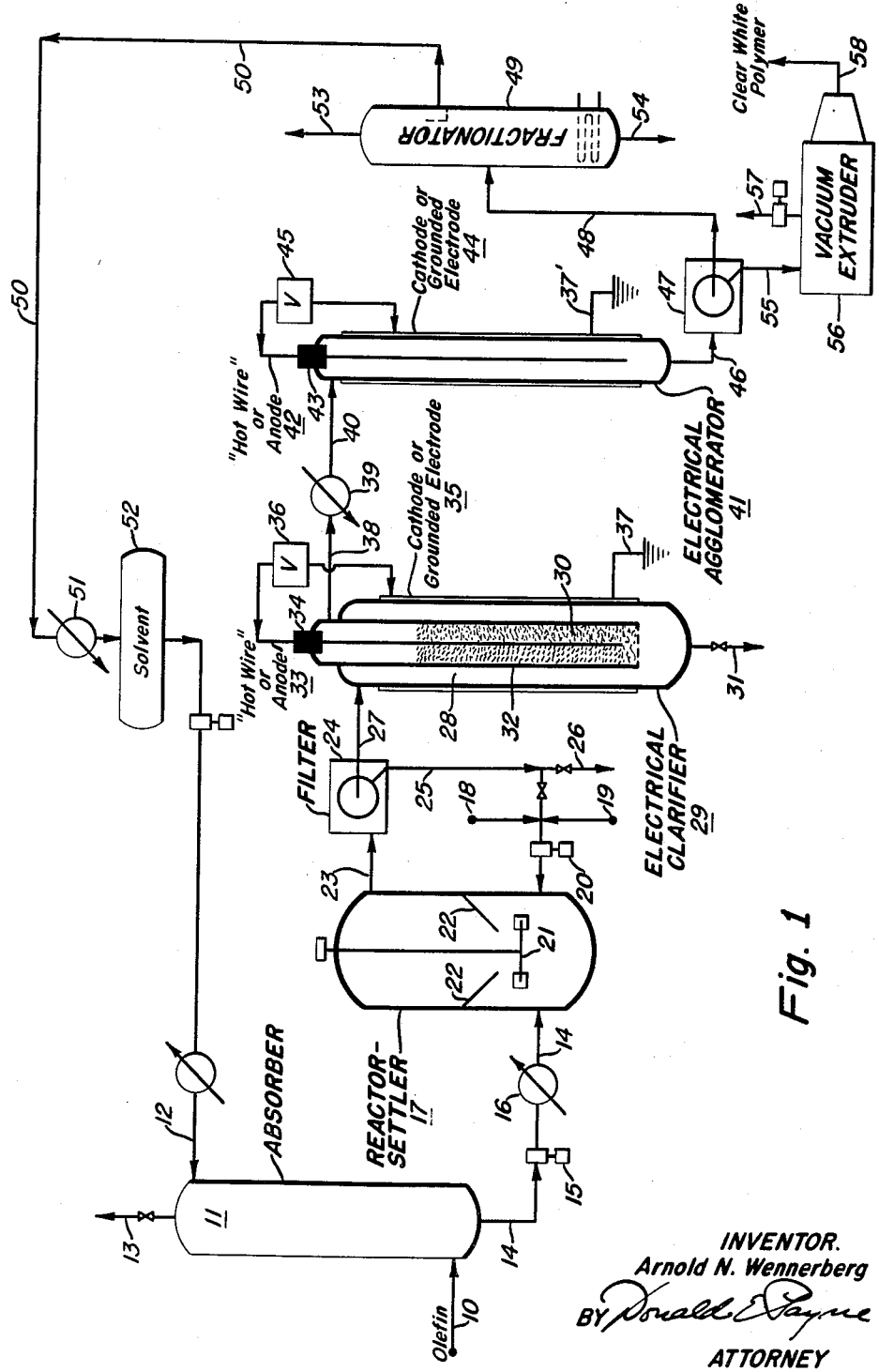

March 22, 1960 A. N. WENNERBERG 2,929,770
ELECTRICAL PURIFICATION APPARATUS
Filed June 20, 1957 3 Sheets-Sheet 1

INVENTOR.
Arnold N. Wennerberg
BY Donald E. Payne
ATTORNEY

March 22, 1960

A. N. WENNERBERG 2,929,770

ELECTRICAL PURIFICATION APPARATUS

Filed June 20, 1957

3 Sheets-Sheet 3

INVENTOR.
Arnold N. Wennerberg

BY
Donald E. Payne
ATTORNEY

2,929,770
ELECTRICAL PURIFICATION APPARATUS

Arnold N. Wennerberg, Chicago, Ill., assignor to Standard Oil Company, Chicago, Ill., a corporation of Indiana Application June 20, 1957, Serial No. 666,968

2 Claims. (Cl. 204—308)

This is a continuation-in-part of copending application Serial No. 623,226, filed November 19, 1956.

This invention relates to improvements in purification apparatus and it pertains more particularly to improved electrical apparatus suitable for treating solutions of solid polymers in dielectric solvents by dielectrophoresis.

The normally solid polymers are preferably those obtained from the polymerization of olefins, particularly normally gaseous straight chain olefins such as ethylene and/or propylene, by means of a catalyst comprising an inorganic solid such as a partially reduced oxide or other compound of a metal of groups IV, V, VI and VIII, preferably distended on a support such as alumina, zirconia or titania, with or without the presence of suitable promoters such as a metal, alloy, hydride and/or hydrocarbon derivative of a metal or metalloid of groups I, II and III, or other materials known by those skilled in the art to have a polymerizing and/or promoting effect (note U.S. 2,692,257, 2,691,647, 2,692,261, etc. and Belgian Patents 530,617, 533,362, 534,792 and 534,888). Such polymers are either formed in the presence of a solvent or are subsequently dissolved in a solvent in order to enable catalyst and/or promoter to be separated therefrom. The solvent should be an organic liquid which is highly dielectric and it may be a saturated cyclic hydrocarbon such as a cyclohexane, an alkyl cyclopentane, etc., a paraffinic hydrocarbon such as normal heptane, isooctane, normal decane, etc., an aromatic hydrocarbon such as benzene, toluene, xylene or other homologue thereof, or a substituted hydrocarbon of these classes, the paraffinic hydrocarbon solvent usually being preferred. The object of this invention is to provide improved means whereby inorganic solids and color bodies may be substantially completely removed from a polymer solution of the class described and whereby recovery of substantially pure polymer from said solution may be accomplished more effectively than has heretofore been possible. Another object is to provide improved apparatus for effecting purification and recovery of liquids generally. Other objects will be apparent as the description of the invention proceeds.

Regardless of whether one polymerizes ethylene and/or propylene to form high density solid polymers by the so-called Standard Oil Company (Indiana) technique, the Phillips technique or the Zeigler technique, he is confronted with the problem of separating solids and color bodies from polymer solution and then with the problem of removing solvent from polymer. I have discovered that both of these separation steps can be enormously improved by dielectrophoresis or, in other words, by effecting the separations in an inhomogeneous electric field wherein the ratio of electrode areas is in the range of about 10:1 to 100:1 and wherein the intensity of the inhomogeneous field (which may be either direct current or alternating current) is in the range of about 2 to 50, preferably 5 to 30, e.g., about 10 kilovolts per centimeter of distance between electrodes. The invention employs certain phenomena described by Herbert A. Pohl in Journal of Applied Physics, vol. 22, No. 7 (July 1951), pages 869–871.

The contaminant-containing polymer solution is preferably first subjected to an electrical clarification step while the solution is at a sufficiently high temperature to avoid precipiation of polymer itself. I have found when such a hot polymer solution, preferably after the coarser solids have been removed by cyclone separation, settling and/or filtration steps, is passed through an inhomogeneous electrical field, the effectiveness of the adsorp- of surface areas greater than 10 with a field strength in the range of about 2 to 50 kilovolts per centimeter of distance between electrodes, most of the solids and some of the color bodies are removed from said solution mostly at the anode or positive small electrode although some of the solids are drawn to the cathode since some electrophoresis takes place even though the major phenomenon is dielectrophoresis. The hot solution may contain color bodies which can be effectively removed by contact with adsorptive material such as Attapulgus clay, silica gel, fuller's earth, bauxite, alumina or equivalent adsorptive solids. I have discovered that when the percolation through adsorptive solids occurs in the inhomogeneous electrical field, the effectiveness of the adsorption step is remarkably enhanced, a given amount of clay removing about 4 to 10 times as much color as would be removed by an equivalent amount of clay in the absence of the inhomogeneous electrical field. The resulting clarified solution is substantially crystal clear.

The high temperature electrical clarification step is preferably effected by first passing the hot solution downwardly as an annular stream in the inhomogeneous electrical field and then passing the solution upwardly through a central tube of smaller diameter which is thus in the highest density portion of the inhomogeneous electrical field. The electrical clarification step should not be confused with electrical precipitation which requires direct current; in my process the current may be either direct or alternating and since the solvent has high dielectric properties, there is very little flow of electrical current, usually less than 20 microamperes.

After the hot polymer solution has been electrically clarified at a sufficiently high temperature to maintain the desired polymer in solution, the solution is cooled or otherwise altered in order to effect solidification of a polymer phase in a solvent phase. The separation of polymers such as solid polyethylene and polypropylene from solvent presents many problems and difficulties because the polymer may separate out of solution in extremely finely divided physical form or in gelatinous form or in other forms which are extremely difficult to filter. I have discovered that if such a difficultly filterable suspension of polymer in solvent is passed through an inhomogeneous electrical field while a voltage difference of the order of 5 to 10 kilovolts per centimeter is built up between two electrodes having a ratio of surface areas greater than 10:1 and preferably at least 30:1, an exposure time of the order of 5 to 15 seconds is adequate to agglomerate the polymer into large dense particles which can be easily filtered or centrifuged. At peak potentials very much above 10 kilovolts with a contact time in excess of about 15 seconds, the agglomerated particle size and density tend to increase but the subsequent release of polymer from electrode at zero voltage is less complete; in other words, the use of unduly high voltages may result in agglomerated polymer sticking to one or both of the electrodes which, of course, is undesirable since it further complicates the separation problem.

Figure 2:
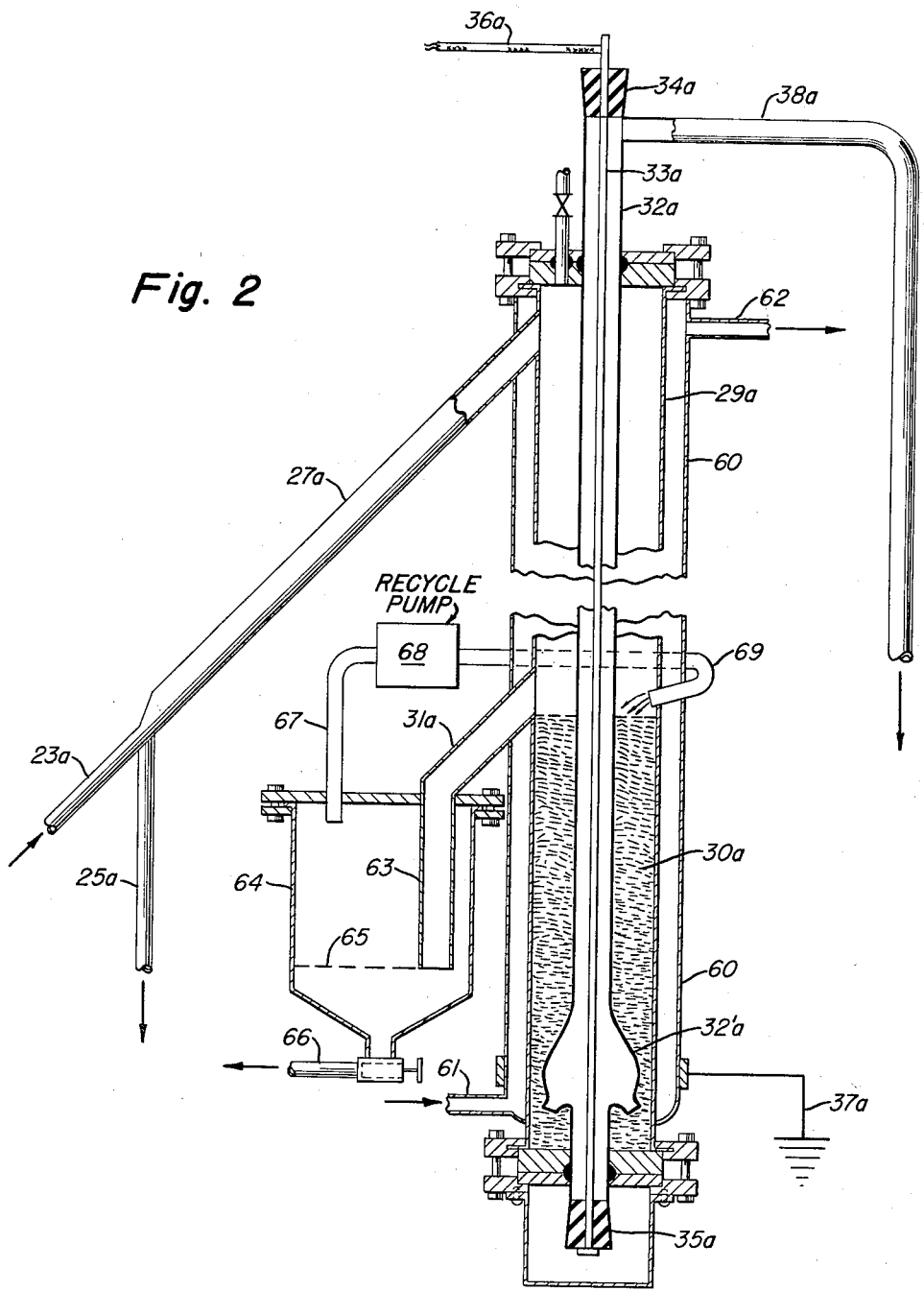
Figure 3:
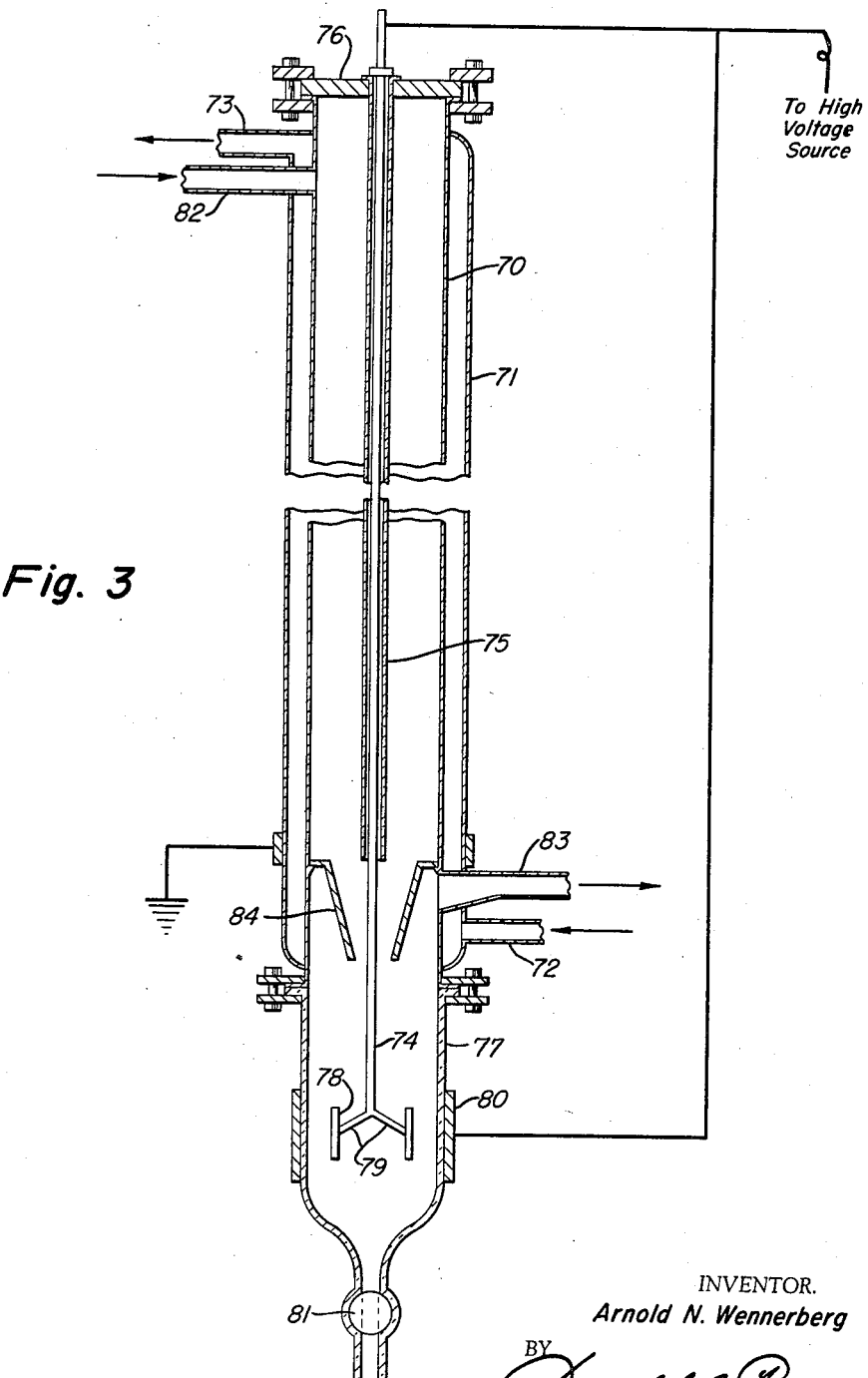

The invention will be more clearly understood from the following detailed description of specific examples thereof read in conjunction with the accompanying drawings which form a part of this specification and in which:

Figure 1 is a schematic flow diagram of my improved solid polymer purification and recovery system, Figure 2 is a modified clarification system, and Figure 3 is another modification of clarification and/or agglomerating apparatus.

Referring to Figure 1, a crude ethylene stream is introduced through line 10 to the base of absorber 11 wherein it is countercurrently contacted with cool normal decane which is introduced at the upper part of the absorber through line 12. The absorber may be operated at pressure of about 200 to 2,000 p.s.i.g. at a temperature of the order of about 0 to 50° C. Unabsorbed gases are vented from the top of the absorber through line 13 and the rich ethylene solution is withdrawn from the bottom of the absorber through line 14 and pumped by pump 15 through heater 16 to reactor 17 which may operate at a pressure of the order of 300 to 5,000, e.g. about 1,000 p.s.i.g. at a temperature in the range of about 30 to 300° C., e.g. about 200° C. depending, of course, on the particular catalyst and/or catalyst promoter which is employed. The specific catalyst promoter and reaction conditions may be as set forth in U.S. 2,691,647 or in any other known process for making high density solid polymers of propylene and/or ethylene. The catalyst in this example is introduced from source 18 and the promoter from source 19, both being introduced by pump 20 along with the olefin solution which is introduced through line 14. The amount of olefin in the solution may be in the range of about 1 to 10 percent or more and it is usually of the order about 2 to 6 percent. An impeller type mixer 21 may be mounted in the lower part of reactor 17 for effecting the required intimacy of admixture. A downwardly inclined cone-shaped baffle 22 separates the mixing zone from an upper settling zone in the reactor, the space above the baffle being relatively quiescent so that catalyst solids may settle out and flow back into the mixing zone. Polymer solution is withdrawn from reactor 17 through line 23 at substantially reaction pressure and at a temperature of about 200° C. to separator 24 which may be a cyclone separator, filter or a centrifuge and which in this example is a filter. Filtered solids are returned by line 25 for return to the reactor in slurry form by pump 20 or alternatively they may be withdrawn from the system through line 26.

The hot filtered solution which leaves the filter through line 27 still contains about .2 percent of catalyst fines (including color bodies), about 2.9 percent of polyethylene, 3.9 percent of unreacted ethylene and 93 percent solvent. Although unreacted ethylene may be flashed from this hot solution and returned to the absorber and the remaining solution may be depressured, its temperature should be high enough to keep the solid polymer in solution, i.e. about 150–200° C. This hot solution is passed downwardly through open annular space 28 between outer cylindrical walls of vessel 29 and inner cylindrical vessel walls 32, the outer vessel being provided with a valved draw-off line 31 at its base and being sealed at its top to the outer upper part of inner vessel 32 which in turn contains a bed of adsorptive solids such as Attapulgus clay, silica gel, fuller's earth, or the like, 30 packed around central electrode 33 which is insulated from the respective vessels by insulator 34. In this example the walls of the vessels were of glass, the inner electrode was a 16 gauge Nichrome wire 10 inches long and an outer electrode 35 was formed around outer vessel 29 by simply wrapping metal foil around said vessel. The distance between the central "hot wire" electrode (anode with D.C.) 33 and the outer grounded electrode (cathode with D.C.) was in this case approximately 3 centimeters. An electrical current source 36 was connected to anode 33 on one side and to cathode 35 at its other side (the cathode was grounded at 37) so as to maintain a voltage drop across the electrodes of about 30 kilovolts (i.e. about 10 kilovolts per centimeter). While direct current was employed in this particular example, alternating current may be used equally well. The actual current is small, about 1 to 20 microamperes.

During normal operation of the electrical clarifier which has been hereinabove described, most of the catalyst solids separate out of the solution as it flows downwardly in annular space 28 and concentrated catalyst slurry may be removed from time to time by opening the valve in line 31. As the solution passes upwardly through the solid adsorbent material in the inhomogeneous field, all color bodies are eliminated from the solution so that a substantially crystal clear polymer solution leaves the upper part of the inner vessel through line 38. The flow may be upward in the outer path and downward in the central path, and a filter or other separation device may be employed in place of the illustrated trap. Electrical clarifiers are preferably mounted in parallel so that the adsorbent may be replaced and vessel walls may be cleaned in one system while the other system is on stream. Some degree of polymer clarification may be obtained by percolating the solution through an adsorbent solid system in the absence of any electrical field, i.e. either before or after catalyst solids have been removed, for example, by passage of the solution through an inhomogeneous electrical field in a separate zone; the final polymer thus obtained is usually of inferior color and is inferior in electrical properties to the clarified polymer which is obtained by subjecting the solution simultaneously to percolation through solid adsorbent and to the presence of an inhomogeneous electrical field.

After the electrical clarification step the solution is cooled from a high temperature in the range of about 150–250° C., e.g. 180° C., to a lower temperature in the range of about 50 to 240° C., e.g. about 80° C., as it passes from line 38 through cooler 39 to line 40 and thence to agglomerator 41. Agglomerator 41 is simply a cylindrical conduit provided with a central "hot wire" electrode or anode 42 which is insulated from the conduit by insulation 43 and a cylindrical outer electrode 44 which has an area at least 10 times greater than that of electrode 42, a current source 45 being provided to apply a voltage of about 20 kilovolts across the electrodes. In the agglomerator the polymer is no longer dissolved in solvent but it is suspended therein in fine gelatinous and/or relatively unfilterable form. By building up to peak voltage of about 10 kilovolts per centimeter in a period of about 5 to 15 seconds more or less, then returning to zero potential, the polymer is agglomerated into relatively large dense particles which do not adhere to the electrode surfaces. If unduly high voltages are applied across the electrodes, polymer may loosely adhere to one or both electrodes so that cleaning thereof may become necessary. However, by employing a maximum voltage of the order of 2 to 10 kilovolts per centimeter distance between electrodes and by alternately applying peak voltage and zero voltage across the electrodes at time intervals of about 5 to 50 seconds, polymer is converted into a form which is readily separable from solvent by filtration or other physical separation means. Such as agglomerated suspension of polymer is withdrawn from the base of the agglomerator through line 46 to filter 47 from which solvent is introduced by line 48 to recovery system diagrammatically represented by fractionator 49 from which solvent is returned by line 50 through condenser 51 to storage vessel 52. Any lighter material may be removed from the system through line 53 and any heavier material through line 54.

The filtered polymer agglomerates are withdrawn through line 55 to a vacuum extruder diagrammatically represented by element 56, the polymers being forced in a thin film into a zone of reduced pressure (under relatively high vacuum) for the recovery of additional solvent which may be recovered by line 57. The solvent-free polymer, which is extruded as a ribbon 58 from the vacuum extruder, is remarkably clear and white, is substantially free from solids and ash-forming material as well as color bodies and has excellent electrical properties.

as well as excellent ability to be molded and formed into sheets, plates, films, etc.

In Figure 2 a system is illustrated which may take the place of clarifier 29 and, in fact, may also combine the function of filter 24. In this case, the reactor outlet conduit 23a leads to an inclined conduit 27a which is of relatively large diameter and extends upwardly at an angle of about 45 to 60° or more before entering the upper part of clarifier 29a. The upwardly inclined conduit 27a acts as a settler, the large heavy catalyst particles dropping back to the lower part of the conduit and being returned, e.g., through line 25a, to the reactor. In this case the central electrode 33a is securely held by insulators 34a and 35a at the vertical axis of tubular conduit 32a which is made of nonconducting material such as glass and which, in this example, may be about 1 to 3 or more inches in diameter and about 10 to 30 feet or more in height. Central electrode 33a is connected to a high-voltage source through line 36a. The outer walls of clarifier 29a may in this instance consist of a steel pipe which is grounded through jacket 60 at 37a and which is insulated at its top and bottom from central tube 32a. Clarifier tube walls 29a are surrounded by a heating jacket 60 provided with heating fluid inlet 61 and heating fluid outlet 62. The lower part of the annular space between the outer walls of tube 29a and the walls of tube 32a is preferably packed with Filter-Cel, clay or other adsorptive or filtration material 30a. At the upper surface of such material there is a downwardly inclined conduit 31a terminating in a vertical column 63 in collection pot 64 which is provided with a filter element 65 for retaining solids in the lower part of this pot, the solids being removed by conduit 66 for return to the reactor with solids from line 25a. Clear liquid from the upper part of pot 64 is returned through conduit 67 by recycle pump 68 for flushing additional solids from the upper part of the filter bed. The lower part of inner tube 32a is provided with an enlarged section 32'a so that clarified liquid which flows down through filter bed 30a finally flows into the enlarged portion 32'a and thence upwardly through conduit 32a and out through conduit 38a. The end closures for tube 29a may be of any suitable insulating material such as Teflon (a plastic polymer of tetrafluoroethylene), neoprene or the like, preferably in the form of discs held between bolted flanges. As in the previous example, the area of outer electrode 29a is at least 10 and preferably 50 to 100 times or more the area of inner electrode 33a and the voltage drop between electrodes (either A.C. or D.C.) is greater than 2 kilovolts per centimeter and preferably in the range of 5 to 50 kilovolts per centimeter or more. The clarifier of Figure 2 functions generally in the same manner as clarifier 29 in Figure 1. For example, a solid catalyst-containing polypropylene solution dissolved in a high dielectric solvent such as mineral spirits at a temperature in the range of 150° to 180° C. may be fed through the outer annulus at a rate of about 15 vol./vol./hr. with applied potentials of 10–20 kv./cm. of reactor radius, the solid catalyst being returned to the reactor and the solution removed through line 38a being free from solids.

In Figure 3 a system is illustrated which may take the place of agglomerator 41 or clarifier 29. A depending central electrode 42, as illustrated in Figure 1, may tend to "whip" or move around in the outer conduit thus tending toward short circuiting. A lower support or holder must avoid buildup of agglomerated or precipitated material between the central and outer electrode since this again might lead to short circuiting. In the system of Figure 3 a metallic tubular electrode 70, which may be of the order of 4 to 12 inches in diameter and 20 to 40 feet in length, is provided with heating jacket 71 having heat exchange fluid inlet 72 and outlet 73. The central rod or tubular electrode 74 may be surrounded by glass tube 75 throughout at least most of its length and may be supported by insulator disc 76 which is bolted to the top of tube 70 to form the upper closure thereof. In this embodiment a tubular base 77 is bolted to the bottom end of metallic tubular element 70, the tubular base being of glass or other high dielectric material. A metallic guide ring 78 is secured by conductor arms 79 at the bottom of electrode 74, the suspended guide ring being about half the inside diameter of insulator tube member 77. Surrounding said member 77 is a conducting sleeve 80 which is at the same level as ring 78. Both conducting sleeve 80 and central electrode 74 are connected to the high voltage source while the metallic outer electrode 70 is grounded through jacket 71; thus electrical force holds the central electrode in position and prevents whipping and short circuiting without constituting a barrier since precipitated material may fall downwardly through and around ring 78 to be discharged through suspension withdrawal valve 81. In this example solids containing polymer solution is introduced through inlet 82 and passed downwardly through the system under the same conditions as recited in the previous examples. All of the agglomerated solids may be removed with solution from the base of the system as described in Figure 1 or solids-free solution may be withdrawn from outlet 83 in which case an inclined frusto-conical baffle 84 may be employed to direct precipitating solids downwardly. It will be understood, of course, that a vertically movable cleaner may be mounted around glass tube 75 to remove any solids which might tend to accumulate thereon.

The process description and drawings have been highly simplified since no novelty is claimed in the catalysts, promoters or conditions under which the polymer solution is originally obtained. In fact, such a solution may be obtained by dissolving an impure polymer (obtained from any source whatsoever) in an organic dielectric solvent such as the saturated or aromatic hydrocarbons hereinabove described. Solutions of other solids in suitable dielectric solvents may similarly be clarified and freed from color bodies and other impurities while the solution is at a sufficiently elevated temperature to avoid separation of the desired solid; the solution may then be cooled to give a suspension of desired solid in solvent, the suspension may be subjected to an inhomogeneous electrical field as hereinabove described for effecting agglomeration, solvent may be removed from agglomerated solids by settling, centrifuging or filtration and separated solids may be passed through a vacuum extruder for eliminating substantially all solvent from a practically pure strip or ribbon.

While particular embodiments of the invention have been described in considerable detail, it should be understood that alternative apparatus arrangements and operating techniques and conditions will be apparent from the foregoing description to those skilled in the art.

I claim:

1. Apparatus for electrically treating a dielectric liquid polymer solution which comprises an outer tube of conducting material surrounding an inner tube of non-conducting material which in turn surrounds a central electrode which is connected to a high voltage source and which is suspended from an unsulator at the top of the inner tube and thereby insulated from the outer tube, a heating jacket surrounding the outer tube, an inlet line for introducing a solids-containing liquid at the upper part of the annular space between the inner and outer tubes, filtration material in the lower part of the annular space between the inner and outer tubes, a slurry draw-off line leading from the annular space at substantially the level of said filtration material, a communication between the annular space and the inner tube adjacent the lower portions thereof and a discharge line leading from the upper part of the inner tube.

2. The apparatus of claim 1 which includes a solids trapout vessel connection to receive slurry discharged from the intermediate portion of the annular space, means for recycling liquid from the trapout vessel back to the intermediate portion of the annular space and means for separately discharging slurry from the lower part of the trapout vessels.

References Cited in the file of this patent

UNITED STATES PATENTS

| | | |
|---|---|---|
| 1,533,711 | Stevens | Apr. 14, 1925 |
| 2,261,108 | Dillon et al. | Nov. 4, 1941 |
| 2,425,355 | Roberts | Aug. 12, 1947 |
| 2,534,907 | Ham et al. | Dec. 19, 1950 |

FOREIGN PATENTS

| | | |
|---|---|---|
| 858,540 | Germany | Dec. 8, 1952 |